United States Patent [19]

Boike et al.

[11] Patent Number: 5,394,770

[45] Date of Patent: Mar. 7, 1995

[54] CORE LENGTH ADJUSTER

[75] Inventors: Randy J. Boike, Clarkston; Hubert Bung, Rochester Hills; Daniel F. Chegash, Roseville; Donald Miller, Auburn Hills, all of Mich.

[73] Assignee: Telflex Incorporated, Limerick, Pa.

[21] Appl. No.: 44,979

[22] Filed: Apr. 8, 1993

[51] Int. Cl.$^6$ .............................. F16C 1/10; F16B 7/10
[52] U.S. Cl. .................................. 74/502.4; 74/500.5; 74/501.5 R; 74/502.6; 403/104; 403/379
[58] Field of Search ............... 74/500.5, 501.5 R, 502, 74/502.4, 502.6; 403/42, 104, 345, 379

[56] References Cited

U.S. PATENT DOCUMENTS

| 4,177,691 | 12/1979 | Fillmore | 74/501 |
|---|---|---|---|
| 4,688,445 | 8/1987 | Spease | 74/501 |
| 4,841,805 | 6/1989 | Italisno | 74/501.5 |
| 4,887,930 | 12/1989 | Chaczyk et al. | 403/379 |
| 4,903,541 | 2/1990 | Shiota | 74/502.6 |
| 5,163,338 | 11/1992 | Sharp et al. | 74/502.4 |
| 5,178,034 | 1/1993 | Reasoner | 74/501.5 R |
| 5,199,321 | 4/1993 | Nowak | 74/502.6 |
| 5,207,116 | 5/1993 | Sultze | 74/502.4 |
| 5,220,832 | 6/1993 | Petruccello | 74/502.4 |
| 5,261,293 | 11/1993 | Kelley | 74/502.6 |
| 5,293,785 | 3/1994 | Lichtenberg | 74/500.5 |
| 5,295,408 | 3/1994 | Nagle et al. | 74/501.5 R |

FOREIGN PATENT DOCUMENTS 0460839 12/1991 European Pat. Off. ........... 74/502.6

*Primary Examiner*—Vinh T. Luong
*Attorney, Agent, or Firm*—Reising, Ethington, Barnard, Perry & Milton

[57] ABSTRACT

A motion transmitting remote control assembly 10 of the type for transmitting motion along a curved path comprising a conduit 12, a flexible motion transmitting core element 14 movably supported within conduit 12, and an adjustment member 16 connected to one of the conduit 12 and core element 14 for adjusting the effective length thereof. The adjustment member 16 comprises an adjustment housing 24 having a first opening 30, a slider member 26 movably disposed in the housing 24, and a locking member 28 movably disposed in the first opening 30 between a locked position to prevent adjustment of the slider member 26 relative to the housing 24 and an unlocked position to allow adjustment of the slider member 26 relative to the housing 24. The housing 24 has bridges 74 extending across the first opening 30 for alternatively holding the locking member 28 in the locked and unlocked positions.

17 Claims, 3 Drawing Sheets

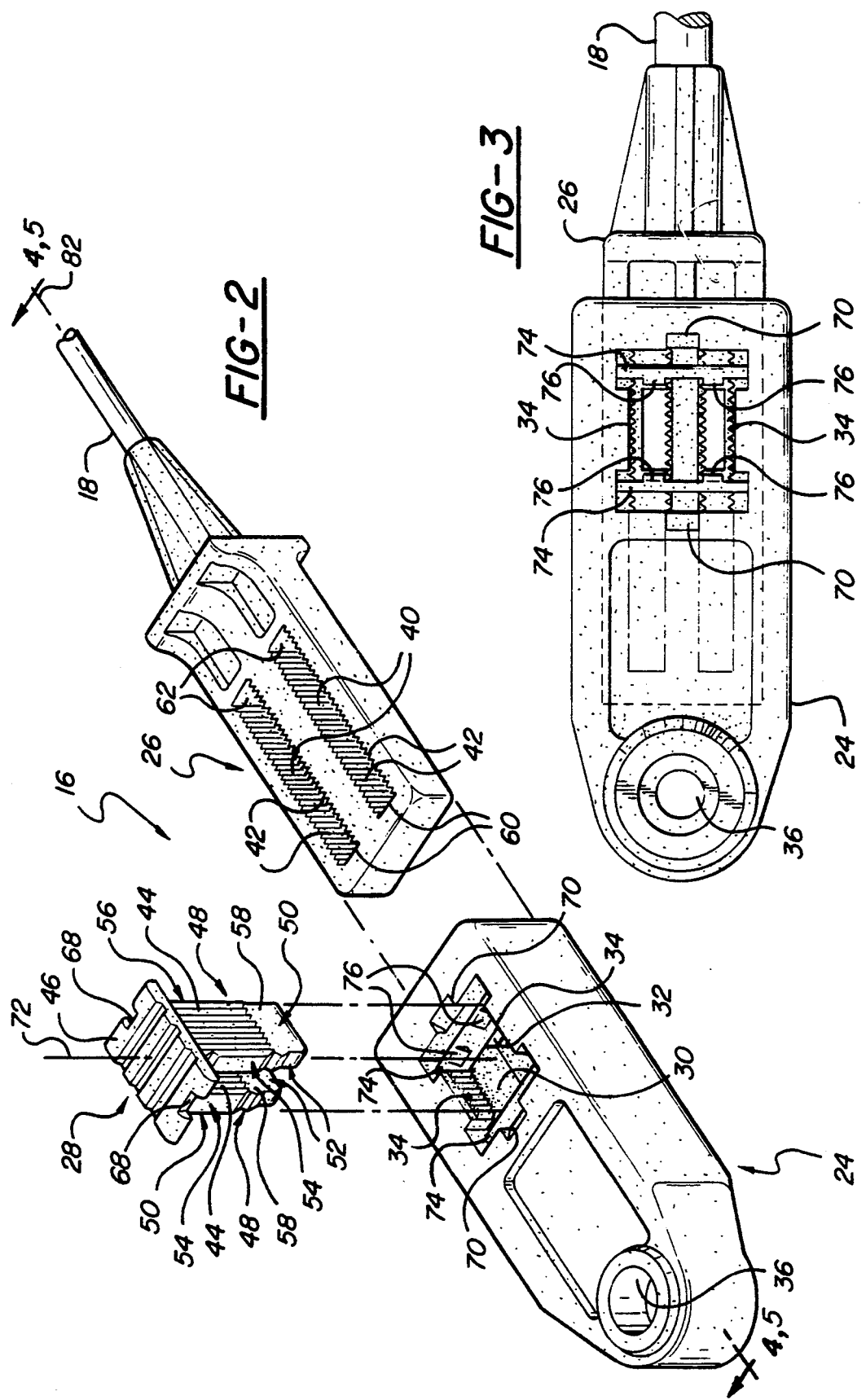

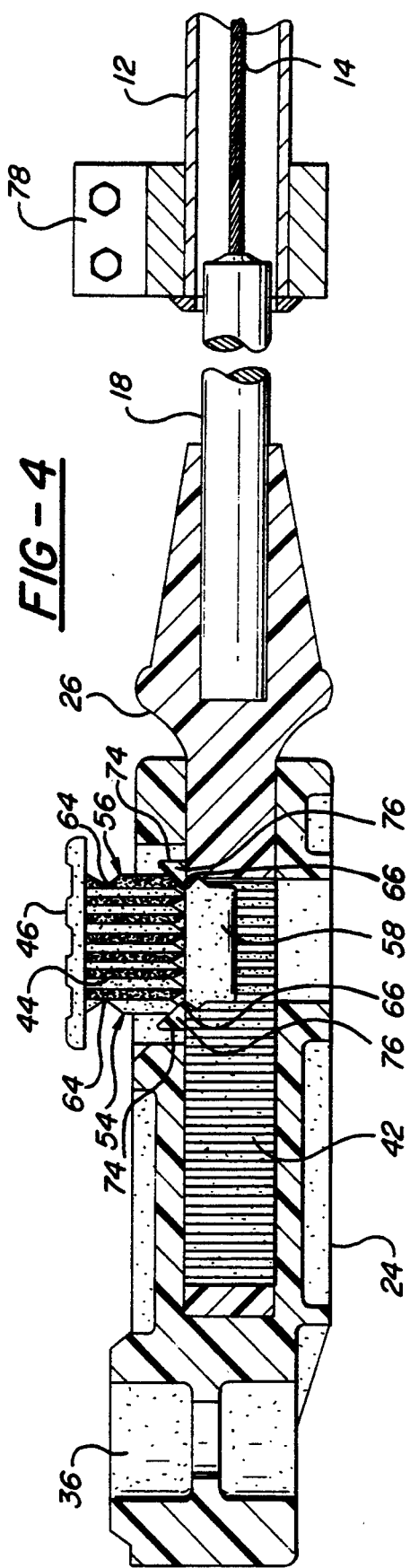
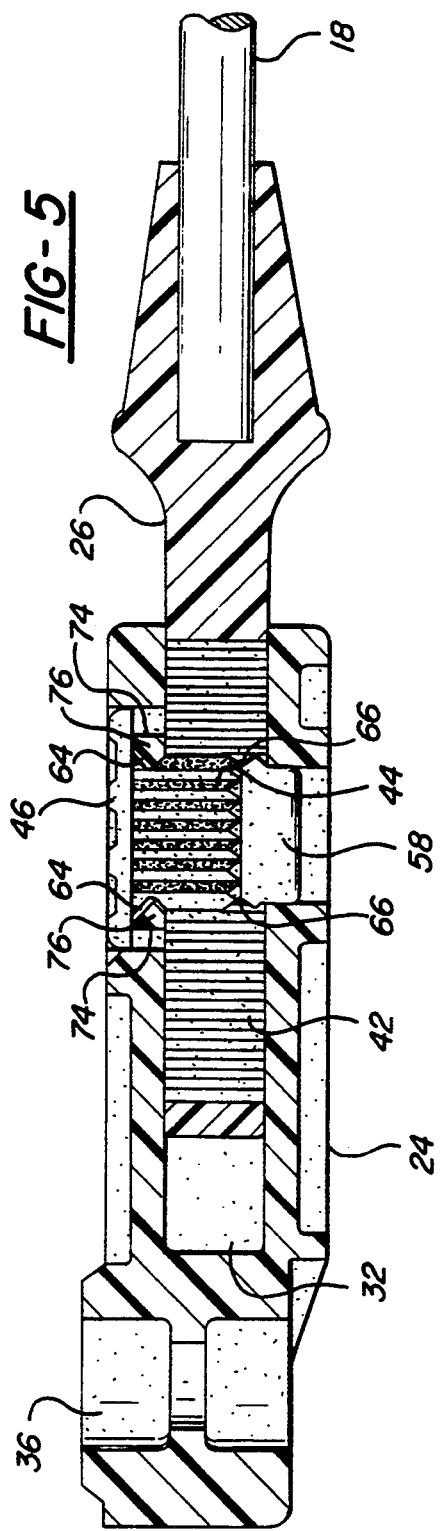

CORE LENGTH ADJUSTER

TECHNICAL FIELD

The subject invention relates to a motion transmitting remote control assembly of the type wherein motion is transmitted in a curved path by a flexible motion transmitting core element movably supported by a flexible conduit.

BACKGROUND OF THE INVENTION

Remote control assemblies of the type for transmitting motion along a curved path normally include means adjacent each end of the conduit for attaching the conduit to a support structure with the core element extending from each end of the conduit. It is frequently desirable to adjust the effective length of the core element. An example of such a situation is wherein a remote control assembly is utilized to interconnect the shift control located in the interior of an automobile and a manual transmission operating lever.

One such remote control assembly is shown in U.S. Pat. No. 4,887,930 granted Dec. 19, 1989 in the name of Chaczyk et al. The Chaczyk '930 patent discloses a manual core adjust assembly comprising a housing, a slider and a locking member movable between a first adjustment and a second locked position. The locking member includes a tab that engages the housing for holding the locking member in the second locked position.

Other remote control core adjust assemblies are disclosed in U.S. Pat. Nos. 4,177,691; 4,688,445; and 4,841,805.

None of the above patents disclose a motion transmitting remote control assembly of the type for transmitting motion along a curved path comprising a housing, a slider member movably disposed in the housing, and a locking member movably disposed in the housing between a locked and unlocked position wherein the housing has a bridge for alternatively holding the locking member in the locked position to prevent adjustment of the slider member relative to the adjustment housing and the unlocked position to allow adjustment of the slider member relative to the adjustment housing.

SUMMARY OF THE INVENTION AND ADVANTAGES

The apparatus of the present invention is a motion transmitting remote control assembly of the type for transmitting motion along a curved path. The assembly comprises a conduit, a flexible motion transmitting core element movably supported within the conduit, and an adjustment means connected to one of the conduit and core element for adjusting the effective length thereof. The adjustment means comprises an adjustment housing having a first opening and a second opening intersecting the first opening and a slider member having slider teeth slidably disposed in the second opening. The adjustment means also comprises a locking member having locking teeth engageable with the slider teeth and movably disposed in the first opening between a locked position with the locking teeth engaging the slider teeth and an unlocked position with the locking teeth disengaging the slider teeth. The assembly is characterized by the adjustment housing having a bridge extending across the first opening for alternatively holding the locking member in the locked position to prevent adjustment of the slider member relative to the adjustment housing and the unlocked position to allow adjustment of the slider member relative to the adjustment housing.

The main advantage of the present invention over the prior art is a core length adjuster with a manually operated locking member having grooves and a housing having bridges with tabs which engage the grooves of the locking member to hold the locking member in either the locked or unlocked position. The design of the present invention allows the locking member as well as the slider member to be symmetrical thereby preventing errors in assembly. The design of the present invention allows for a simpler mold design than that of the prior art thereby cutting the molding process cost. The design of the present invention is more compact than that of the prior art thereby allowing the apparatus of the present invention to fit through smaller confined areas, such as holes. The design of the present invention allows for a greater shear strength to adjuster size ratio than that of the prior art while achieving this with the core length adjuster of the present invention weighing substantially less and using less overall material than the prior art core length adjusters.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is an exploded pictorial view of the preferred embodiment of the invention; and FIG. 3 is a top view of the preferred embodiment with the locking member removed.

FIG. 4 is a sectional view of the preferred embodiment taken along line 4,5—4,5 in FIG. 2 with the locking member shown in the unlocked position.

FIG. 5 is a sectional view of the preferred embodiment taken along line 4,5—4,5 in FIG. 2 with the locking member shown in the locked position.

DESCRIPTION OF THE PREFERRED EMBODIMENT

Figure 1:
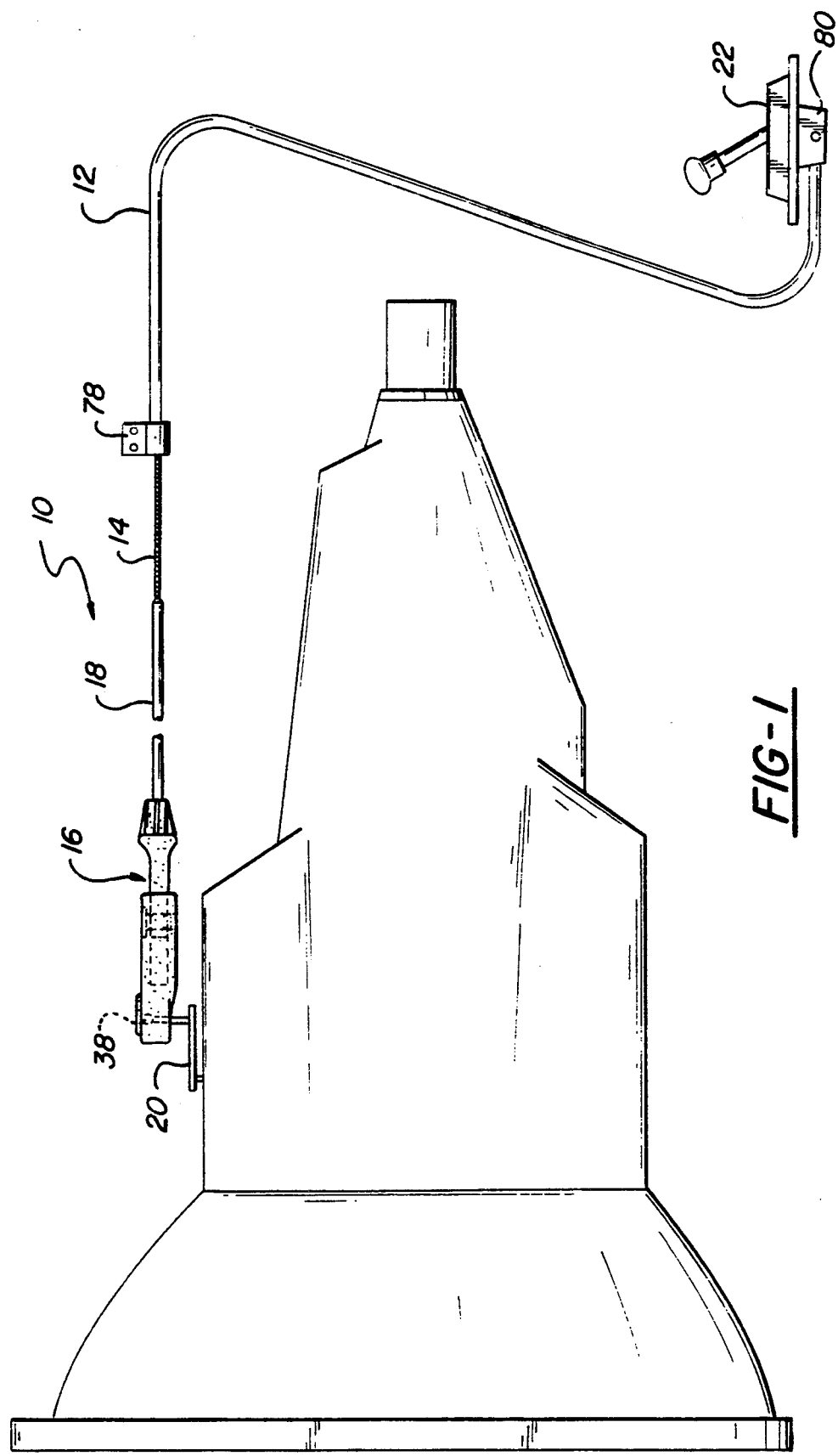
FIG. 1 is a pictorial view of the preferred embodiment of the invention as used in one of its intended environments.

Referring to FIG. 1, a motion transmitting remote control assembly 10 comprising a conduit 12, a flexible motion transmitting core element 14 movably supported within the conduit 12, and an adjustment member 16 for adjusting the effective length of the core element 14 and/or the conduit 12 is shown in one of its intended environments. The core element 14 has a rigid tubular rod 18 secured to one end thereof by conventional means, such as crimping, welding, or soldering. The rod 18 of the core element 14 is secured to the adjustment member 16 in a manner which will be described in detail below. Although not shown in FIG. 1, the conduit 12 could be secured to the adjustment member 16 directly instead of the core element 14. The assembly 10 is connected, in a manner to be detailed latter, at one end to a device 20 to be remotely controlled, such as a vehicle transmission operating lever, and at the other end to a control member 22, such as a vehicle transmission lever for shifting gears.

Referring to FIGS. 2-5, the adjustment member 16 comprises an adjustment housing 24, a slider member 26, and a locking member 28.

The adjustment housing 24 comprises a first rectangular opening 30 extending therethrough and a second rectangular opening 32 in the housing 24 transversely intersecting the first rectangular opening 30. The housing 24 comprises housing teeth 34 which are disposed in the first rectangular opening 30. The purpose of the housing teeth 34 will become apparent from the remainder of the specification. The cross-sectional area of the slider member 26 generally conforms to the cross-sectional area of the second rectangular opening 32. The housing 24 also comprises a connector aperture 36 for connecting the housing 24 to a ball hitch 38 fixedly secured to the device 20 to be remotely controlled as shown in FIG. 1.

The slider member 26 is slidably disposed within the second rectangular opening 32. The slider member 26 comprises a pair of longitudinally disposed rectangular slots 40. Within the slots 40 are disposed opposing parallel rows of slider teeth 42. A portion of the rod 18 of the core element 14 is molded within the slider member 26 thereby securing the core element 14 to the slider member 26.

The locking member 28 having locking teeth 44 is movably disposed in the first rectangular opening 30 between an unlocked position, as shown in FIG. 4, and a locked position, as shown in FIG. 5. In the unlocked position, the locking teeth 44 of the locking member 28 do not engage the slider teeth 42 of the slider member 26. In the locked position, the locking teeth 44 engage the slider teeth 42. The locking member 28 comprises a top body portion 46 and a pair of legs 48 between and around which the slider member 26 extends. The legs 48 have exterior surfaces 50, interior surfaces 52, a front portion 54, and back portion 56. The locking teeth 44 are positioned along a portion of the exterior surfaces 50 and interior surfaces 52 of the pair of legs 48. The housing teeth 34 disposed in the first rectangular opening 30 are engageable with the locking teeth 44 on the exterior surfaces 50 for guiding the movement of the locking member 28 between the unlocked and locked positions.

The pair of legs 48 have non-teeth portions 58 for preventing removal of the slider member 26 from the housing 24 when the locking member 28 is in the unlocked position. When the locking member 28 is in the unlocked position only the non-teeth portions 58 of the locking member 28 extend into the rectangular slots 40 thus allowing a user of assembly 10 to freely slide the slider member 26 within the second rectangular opening 32. However, the non-teeth portions 58 limit the movement or adjustment of the slider member 26 relative to the housing 24 between a fully extended position, as shown in FIG. 1, and a fully withdrawn position, as shown in FIG. 4. When the locking member 28 is in the unlocked position and the slider member 26 is pulled to the fully extended position, the non-teeth portions 58 act as a stopper engaging first slot end walls 60 thereby preventing the removal of slider member 26 from the housing 24. When the locking member 28 is in the unlocked position and the slider member 26 is pushed to the fully withdrawn position, the non-teeth portions 58 again act as a stopper engaging second slot end walls 62 thereby limiting the amount the slider member 26 can be pushed into the second rectangular opening 32 of the housing 24.

The front and back portions 54, 56 of legs 48 have upper grooves 64 and lower grooves 66. The purpose of grooves 64, 66 will be described latter in this description. Notches 68 disposed on the top body portion 46 of locking member 28 and corresponding slanted grooves 70 disposed on the housing 24 adjacent the first rectangular opening 30 are provided to facilitate the removal of the locking member 28 from the locked position. When the locking member 28 is in the locked position a user can insert the tip of a flat headed screwdriver or similar type tool into one of the slanted grooves 70 and corresponding notches 68 and use the screwdriver to pry on the top body portion 46 of locking member 28 until the locking member 28 is removed from the locked position. The locking member 28 is symmetrical about a central axis 72.

The motion transmitting remote control assembly 10 is characterized by the housing 24 comprising bridges 74 extending across said first rectangular opening 30 for alternatively holding the locking member 28 in the locked position to prevent adjustment of the slider member 26 relative to the housing 24 and the unlocked position to allow adjustment of the slider member 26 relative to the housing 24. The bridges 74 have tabs 76 for alternatively engaging upper grooves 64 to hold the locking member 28 in the locked position, as shown in FIG. 5, and lower grooves 66 to hold the locking member 28 in the unlocked position, as shown in FIG. 4. The bridges 74 must be flexible enough to allow the tabs 76 to engage the grooves 64, 66.

In operation, the core element 14 end not connected to rod be is connected to the control member device 22 and housing 24 is connected to the device 20 to be controlled via the connector aperture 36 and ball hitch 38. As shown in FIG. 1, the conduit 12 is fixedly secured at one end to a first fixed section 78 positioned adjacent the device 20 to be controlled and at the other end to a second fixed section 80 positioned adjacent the control member 22. With this configuration, the core element 14 is free to slide within the conduit 12 thereby transmitting motion in a curved path from a control member 22 to a device 20 to be controlled. The slider member 26 is then slid into the first rectangular opening 30. It is important to note that there is no top or bottom orientation for the slider member 26 it is slid into the first rectangular opening 30, i.e., the slider member 26 is symmetrical about a slider axis 82. Although not shown, the slider teeth 42 may be chamfered at one or both ends to facilitate the engagement of the locking teeth 44 with the slider teeth 42 when the locking member 28 is pushed into the locked position. The locking member 28 is manually inserted into the first rectangular opening 30 of the housing 24 such that the legs 48 are disposed within the slots 40, the tabs 76 on the bridges 74 are engaged in the lower grooves 66 and the locking teeth 44 on the exterior surface 50 of legs 4S are engaged and guided by the housing teeth 34. The locking member 28 is held in the unlocked position by the tabs 76 engaged within the lower grooves 66. The housing teeth 34 guide the locking member 28 via the locking teeth 44 on the exterior surfaces 50 from the unlocked position to the locked position. While the locking member is in the unlocked position, the slider member 26 is able to slide within the housing 24 without being inadvertently removed from the second rectangular opening 32 due to the non-teeth portions 58 within the slots 40.

Once the effective length the core element 14 is adjusted by sliding the slider member 26 either into or out of the housing 24 the locking member 28 is manually urged downwardly to the locked position wherein the tabs 76 engage the upper grooves 64 thereby holding the locking member 28 in the locked position. As the locking member 28 is urged downwardly the bridges deflect or flex away from the front and back portions 54, 56 of legs 48 to allow passage of the locking member 28. In the locked position, the locking teeth 44 are engaged with the slider teeth 42. In the locked position, the slider member 26 cannot move relative to the housing 24 since both the top body portion 46 and the non-teeth portions 58 of the locking member 28 abut the perimeter of the first rectangular opening 30. Additionally, the housing teeth 34 also act to prevent the movement of the slider member 26 within the housing 24.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly (10) of the type for transmitting motion along a curved path, said assembly (10) comprising:
   (a) a conduit (12);
   (b) a flexible motion transmitting core element (14) movably supported within said conduit (12);
   (c) adjustment means (16) connected to one of said conduit (12) and core element (14) for adjusting the effective length thereof, said adjustment means (126) comprising:
      i) an adjustment housing (24) having a first opening (30) and a second opening (32) intersecting said first opening (30);
      ii) a slider member (26) having slider teeth (42) slidably disposed in said second opening (32);
      iii) a locking member (28) having locking teeth (44) engageable with said slider teeth (42) and movably disposed in said first opening (30) between a locked position with said locking teeth (44) engaging said slider teeth (42) and an unlocked position with said locking teeth (44) disengaging said slider teeth (42); and characterized by
      iv) said adjustment housing (24) having housing teeth (34) disposed in said first opening (30) and engageable with said locking teeth (44) for guiding the movement of said locking member (28) between said unlocked position and said locked position wherein said housing teeth (34) engage with said locking teeth (44) while said locking teeth (44) engage said slider teeth (42).

2. The apparatus of claim 1 further characterized by said adjustment housing (24) having a bridge (74) extending across said first opening (30) for alternatively holding said locking member (28) in said locked position to prevent adjustment of said slider member (26) relative to said adjustment housing (24) and said unlocked position to allow adjustment of said slider member (26) relative to said adjustment housing (24).

3. The apparatus of claim 2 further characterized by said first opening (30) having a rectangular shape and comprising a first pair of parallel sides and a second pair of parallel sides wherein said bridge (74) is spaced apart from said first pair of parallel sides and extends across and connects said second pair of parallel sides.

4. The apparatus of claim 2 further characterized by said locking member (28) having an upper groove (64) and a lower groove (66).

5. The apparatus of claim 4 further characterized by said bridge (74) having a tab (76) for alternatively engaging said upper groove (64) to hold said locking member (28) in said locked position and said lower groove (66) to hold said locking member (28) in said unlocked position.

6. The apparatus of claim 1 further characterized by said locking member (28) having a pair of legs (48) between and around which the slider member (26) extends.

7. The apparatus of claim 6 further characterized by said pair of legs (48) having exterior surfaces (50) and interior surfaces (52).

8. The apparatus of claim 7 further characterized by said locking teeth (44) positioned along a portion of said exterior (50) and interior (52) surfaces of said pair of legs (48).

9. The apparatus of claim 8 further characterized by said pair of legs (48) comprising non-teeth portions (58) for preventing removal of said slider member (26) from said adjustment housing (24) when said locking member (28) is in said unlocked position and for preventing movement of said slider member (26) relative to said adjustment housing (24) when said locking member (28) is in said locked position.

10. The apparatus of claim 1 further characterized by said flexible core element (14) including a rigid tubular rod (18) fixedly secured to one end thereof, said rod (18) fixedly secured to said adjustment means (16).

11. The apparatus of claim 1 further characterized by a locking member removal facilitating means for facilitating the removal of said locking member (28) from said locked position.

12. The apparatus of claim 11 further characterized by said facilitating means including a notch (68) disposed on said locking member (28) and a corresponding slanted groove (70) adjacent said first opening (30).

13. The apparatus of claim 1 further characterized by said locking member (28) having a central axis (52).

14. The apparatus of claim 13 further characterized by said locking member (28) being symmetrical about said central axis (52).

15. The apparatus of claim 1 further characterized by said first opening (30) transversely intersecting said second opening (32).

16. The apparatus of claim 1 further characterized by said slider member (26) having a slider axis (82).

17. The apparatus of claim 16 further characterized by said slider member (26) being symmetrical about said slider axis (82).

* * * * *